United States Patent [19]
Nahumi

[11] Patent Number: 5,390,177
[45] Date of Patent: Feb. 14, 1995

[54] CONFERENCING ARRANGEMENT FOR COMPRESSED INFORMATION SIGNALS

[75] Inventor: Dror Nahumi, Eatontown, N.J.

[73] Assignee: AT&T Corp., Murray Hill, N.J.

[21] Appl. No.: 36,588

[22] Filed: Mar. 24, 1993

[51] Int. Cl.⁶ .............................................. H04Q 11/04
[52] U.S. Cl. ..................................... 370/62; 379/202
[58] Field of Search ....................... 370/62, , 112, 109, 370/118, 7, 16, ; 379/202, 158, 410, 67, 89, 199, 196, 197, 204, 205, 213, 189, 201, 207, 216; 375/122; 358/142, 47, 315, 426, 425, 446, 465; 340/827; 348/384

[56] References Cited

U.S. PATENT DOCUMENTS

| | | | |
|---|---|---|---|
| 4,499,578 | 2/1985 | Marouf et al. | 370/62 |
| 5,127,001 | 6/1992 | Steagall et al. | 370/62 |
| 5,150,410 | 9/1992 | Bertrand | 370/62 |
| 5,157,491 | 10/1992 | Kassatly | 370/62 |

OTHER PUBLICATIONS

U.S. patent application Ser. No. 07/999063 (A. Feiner et al. Case 41-1-8-28-22), filed on Dec. 31, 1992.

*Primary Examiner*—Douglas W. Olms
*Assistant Examiner*—Dang Ton
*Attorney, Agent, or Firm*—David R. Padnes

[57] ABSTRACT

A conferencing bridging technique for compressed information signals which monitors the signal energy transmitted by each conferee. When there is only one conferee speaking, the summing circuit in the bridge unit is bypassed along with the speech decoding/coding apparatus and the talking conferee's signal is broadcast to all conferees. If there is more than one conferee speaking at any given time, then only the speaking conferee's signals are routed to an associated speech decoder wherein those conferees' compressed signals are decompressed. These decompressed signals are then combined by the summing circuit and the sum is recompressed and broadcast to all conferees. Advantageously, the above-described technique eliminates the signal degradation associated with tandeming of signal decoding and coding operations and permits the sharing of a smaller number of signal decoders among a larger number of conferees.

14 Claims, 2 Drawing Sheets

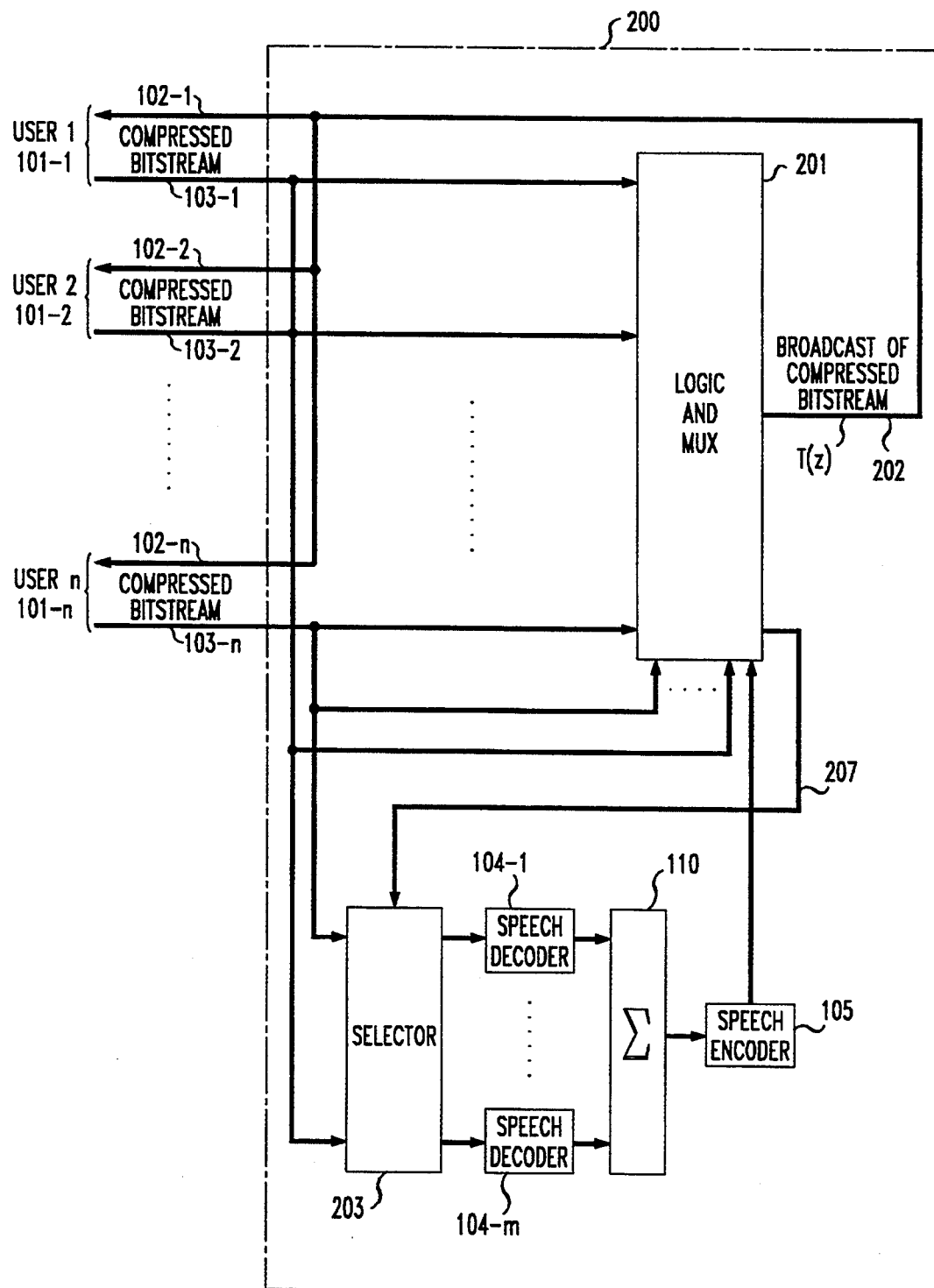

CONFERENCING ARRANGEMENT FOR COMPRESSED INFORMATION SIGNALS

TECHNICAL FIELD

The present invention relates to a technique for providing conferencing capability and, more particularly, to a technique for providing this capability when the signals to be conferenced are compressed.

BACKGROUND OF THE INVENTION

Conferencing is the capability of coupling information signals among three or more users in a communications system. The information signals are typically voice signals but, with the advent of multimedia communications capabilities, can also be nonvoice signals, i.e., data, video, facsimile and the like.

Signal compression techniques have long been used to reduce the bandwidth required for signal transmission. These techniques have been used for both voice and data signals.

When compressed information signals are conferenced using existing conference bridging techniques, the compressed signals are each decompressed, summed and this sum is then recompressed and broadcast to all conferees. The problem with this approach is that the tandeming, i.e., serial connection of signal coders and decoders to respectively compress and decompress the information signal, degrades the resulting signal quality to a level that, in trial studies, has been found to be objectionable to many conferees. Another problem is that the bridging apparatus can be costly, especially for conference bridging apparatus capable of conferencing a large number of conferees. At times, the signal degradation and/or the apparatus costs associated with conferencing equipment can exceed system objectives. At such times, the prior art solution has been to utilize only uncompressed signals. This solution, in turn, requires a higher bandwidth communications channel between any potential conferee and the conferencing apparatus. This requirement can be expensive or difficult to provide. This is especially true in communications system applications where the number of potential conferees is quite large. It would, therefore, be desirable if a conferencing arrangement could be devised for compressed signals which overcomes the limitations of the prior art.

SUMMARY OF THE INVENTION

The present invention relates to a conferencing arrangement for compressed information signals. Pursuant to the present invention, when there is only one conferee speaking, the summer in the conference bridge is bypassed and that conferee's signal is broadcast to all conferees. If, on the other hand, there is more than one conferee speaking, the signals of only those conferees who are speaking are routed to an associated speech decoder. The decompressed speech signals outputted by each decoder are then summed and this sum is compressed again and broadcast to all of the conferees. The above-described technique advantageously reduces the signal degradation associated with the tandeming of signal coders and decoders and permits the sharing of a smaller number of signal decoders among a larger number of conferees.

BRIEF DESCRIPTION OF THE DRAWING

FIG. 2 is a block-schematic diagram of a conference bridge unit in accordance with the present invention.

DETAILED DESCRIPTION

Figure 1:
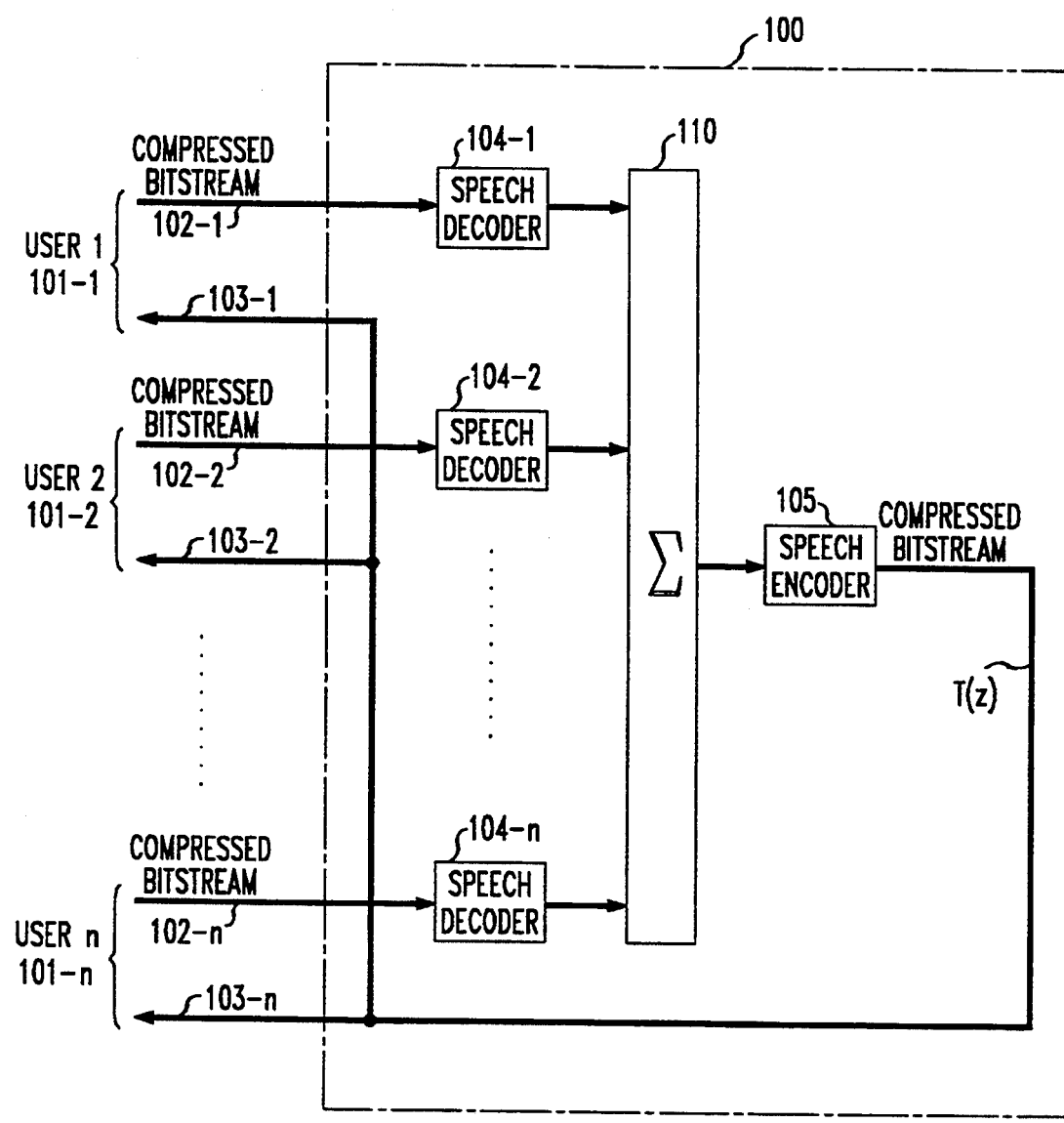
FIG. 1 is a block-schematic diagram of a prior art conference bridge unit.

Prior art bridge 100, shown in FIG. 1, provides illustrative voice conferencing communications capability for n users, where n is a predetermined integer greater than 2. Each of the n users is connected to the conference bridge via one of n two-wire communications paths 101-1 through 101-n. Each of these paths includes an incoming lead 102 and an outgoing lead 103. Summer 110 in the bridge unit is connected to each incoming lead 102 and provides an output signal, T(z), to each outgoing lead 103. For purposes of illustration, it shall be assumed that the summer provides unity gain and no loss is introduced by the bridge unit. The output signal T(z) is therefore equal to the sum of the signals on all n incoming leads 102. This output signal is coupled to each of the n users and is processed using well-known techniques so that each user hears the speech of any of the n-1 other users.

In the illustrative circuitry of FIG. 1 the signals coupled to and from the conference bridge are compressed signal samples. As a result, the conference bridge unit includes speech decoders 104-1 through 104-n to decompress the speech signals in each of the n incoming leads. The output signal provided by each speech decoder can be either an uncompressed digital signal or an analog signal. In any event, the decoding function is needed to form the signal sum. After summing, the decompressed signals must be compressed prior to being broadcast to all users. Speech encoder 105 provides this function.

Refer now to FIG. 2 which shows an illustrative embodiment of the present invention. To overcome the signal degradation associated with the tandeming of several compressors/decompressors, conference bridge unit 200 incorporates logic circuit 201. Circuit 201 includes well-known signal energy detection apparatus which monitors the signal energy in each of the incoming leads. With the available signal compression algorithms, this function can be provided without completely decoding any of the compressed bitstreams. That is, the signal energy present in each of the incoming leads can be determined by directly monitoring the compressed bitstream in that lead or by monitoring a partially decoded version of this bitstream. The latter is, of course, generally preferable as it avoids the need for a decoder in each of the incoming leads.

When there is energy present in only one lead, indicating only one talking conferee, this conferee's compressed signal is broadcast to all conferees via lead 202 without passing the speech decoder and coder and without passing through summer 110. If, however, there is more than one talking conferee at a given time, then only those conferees' signals are coupled to speech decoders. The talking conferees, i.e., the incoming lines on which signal energy above a predetermined threshold is present, are identified by logic circuit 201 and these incoming lead identifications are provided to selector 203 via lead 207. Selector 203 is coupled to each of the n incoming leads and, in response to the identification signal on lead 207, couples each of the identified incoming leads to a different one of speech decoders 104-1 through 104-m. These speech decoders are identical to those in FIG. 1. However, recognizing that only the speaking conferees' signals must be decompressed and the number of conferees speaking at the same time is generally one or, at worse, a small subset of the total number of conferees, the bridge unit can be configured with fewer decoders than the maximum number of conferees. Therefore, the integer m is less than n by some predetermined amount and the decoders in FIG. 2 are effectively shared between the conferees as needed. This use of m decoders instead of n decoders does not degrade system performance if it is recognized that when the number of speaking conferees at any time is substantially more than one, the information is probably unintelligible. Accepting this conclusion, a conference bridge in accordance with the present invention can utilize far fewer decoders than the maximum number of conferees at any time.

Each of the compressed speech signals coupled through selector 203 is decompressed by its associated speech decoder and summer by summer 110. The sum thus formed is then compressed by speech encoder 105 before being broadcast to all conferees in the same manner as in FIG. 1.

It should, of course, be noted that while the present invention has been described in terms of an illustrative embodiment, other arrangements will be apparent to those of ordinary skill in the art. For example, while the present invention has been described relative to the conferencing of compressed digital signals representative of speech, the present invention is applicable to the processing of compressed digital signals regardless of the information represented by such signals. Second, while in the disclosed embodiment there is no echo cancellation or suppression apparatus provided in the conferencing arrangement, the present invention can incorporate such apparatus. Third, while in the disclosed embodiment, one conference bridge 200 is utilized, in other conferencing arrangements a plurality of conference bridges interconnected to each other may be utilized. Finally, while the disclosed embodiment utilizes discrete devices, these devices can be implemented using one or more appropriately programmed general-purpose processors, or special-purpose integrated circuits, or digital processors, or an analog or hybrid counterpart of any of these devices.

I claim:

1. Apparatus for providing conferencing communications comprising
   means for combining signals from at least three input communications paths onto an output communications path;
   means for monitoring the signal energy in each of the input communications paths; and
   means responsive to the signal energy monitoring for bypassing said combining means and coupling the signal on one of the input communications paths onto the output communications path when said signal energy monitoring provides a first result.

2. The apparatus of claim 1 wherein said first result is that the signal energy monitored is above a predetermined threshold on only one of the input communications paths.

3. The apparatus of claim 2 wherein the one signal bypassing said combining means and being coupled onto the output communications path is that signal whose signal energy exceeds said predetermined threshold.

4. The apparatus of claim 3 wherein said predetermined threshold corresponds to the signal energy present typically associated with a person speaking.

5. The apparatus of claim 1 further including means responsive to a second result of the signal energy monitoring for coupling the signal on each of a subset of the communications paths to a corresponding signal decoder and thence to said combining means.

6. The apparatus of claim 5 wherein said subset includes only those communications paths whose associated signal energy exceeds a predetermined threshold.

7. The apparatus of claim 5 wherein said coupling means includes a demultiplexer.

8. The apparatus of claim 1 wherein any signal on the input communications paths includes a sequence of compressed digital signal samples and said combining means includes means for decompressing compressed digital signal samples on certain ones of the input communications paths.

9. The apparatus of claim 8 wherein the certain ones of the incoming communications paths varies with time.

10. The apparatus of claim 8 wherein the certain ones of the input communications paths are determined by said signal energy monitoring means.

11. The apparatus of claim 10 wherein the certain ones of the communications paths are those determined by said signal energy monitoring means to be communicating a signal having an associated signal energy level greater than a predetermined threshold.

12. A method for providing conferencing communications comprising
    combining signals from at least three input communications paths onto an output communications path;
    monitoring the signal energy in each of the input communications paths; and
    bypassing said combining means and coupling one of the signals onto the output communications path when the signal energy monitoring step provides a first result.

13. Apparatus comprising means for monitoring the signal energy level present on each of at least three communications paths, and identifying those paths whose associated signal energy levels exceed a predetermined threshold, the presence of signal energy on any of said paths being representative of an associated compressed signal on that path;
    means for decompressing any associated compressed signal; and
    means for coupling only those identified paths to said decompressing means;
    a signal combiner connected to said decompressing means; and
    means for bypassing said signal combiner when said monitoring means identifies only one path.

14. A method comprising the steps of
    monitoring the signal energy level present on each of at least three communications paths; and identifying those paths whose associated signal energy levels exceed a predetermined threshold, the presence of signal energy on any of said paths being representative of an associated compressed signal on that path;
    decompressing any associated compressed signal;
    coupling only those paths in said decompressing step through a signal combiner to an output when more than one path is identified and bypassing said signal combiner when only one signal path is identified and coupling this one path to said output.

* * * * *